United States Patent Office 2,836,503
Patented May 27, 1958

2,836,503

CELLULOSIC SPONGE PROCESS

Robert Otto Osborn, Snyder, N. Y., assignor to E. I. du Pont de Nemours and Company, Wilmington, Del., a corporation of Delaware No Drawing. Application March 22, 1954
Serial No. 417,961

3 Claims. (Cl. 106—122)

This invention relates to the production of artificial sponge. More particularly, it relates to the production of cellulosic sponge from cellulosic solutions or dispersions such as viscose.

In the usual manufacture of artificial cellulosic sponge, a pasty mass is prepared by mixing together viscose (cellulose xanthate dissolved in caustic soda solution), strength-giving fibers such as hemp or jute, and a soluble pore-forming substance such as sodium sulfate decahydrate. This mixture is then placed in molds and coagulated by heat and/or the chemical action of a suitable solution. After coagulation, the pore-forming substance is melted or washed from the mass; and the resulting sponge-like material is washed, dried and/or subjected to other finishing treatments, and cut into appropriate blocks. The character and size of the pores of the sponge so formed is dictated in the main by the nature, amount and particle size of the pore-forming substance employed. For example, when using sodium sulfate decahydrate crystals, sponges of a porosity suitable for ordinary purposes are produced by incorporating in the mix from 50% to 90% by weight of crystals (based on the total weight of the mix) of such size that all of the crystals will pass through a screen having openings 0.5 inch in diameter; and at least 50% will pass an opening of 0.3 inch in diameter and stay at an opening 0.1 inch in diameter. Where it is desired to produce sponges of very fine porosity, fine crystals only are employed; and a portion of the pore-forming substance may be in the form of anhydrous powder. However, with known pore-forming substances, even though the predetermined amounts and sizes thereof are adhered to with great care, it has always been difficult to obtain a cellulosic sponge structure having uniform pattern of pore sizes (i. e., a uniform distribution of pore sizes in all sections of the sponge structure) and with pore walls having proper characteristics upon which the desirable rapid-wetting and wipe-dry properties of the sponge depend.

An object of this invention, therefore, is to provide a process for producing cellulosic sponges of high quality characteristics. Another object is to provide a process for producing from viscose, cellulosic sponges having a uniform pattern of pore sizes and rapid-wetting and wipe-dry characteristics. The foregoing and other objects will more clearly appear hereinafter.

These objects are realized by the present invention which, briefly stated, comprises uniformly incorporating in fiber-containing viscose, as by mixing, Glauber's salt crystals and aluminum powder in proportions hereinafter specified, placing the resulting sponge mix in molds, allowing said sponge mix to expand to maximum volume and become set (i. e., gelation starts) before coagulation and regeneration takes place, and thereafter coagulating and regenerating the expanded sponge mix, followed by the customary washing, bleaching, purifying, and drying steps.

The amount of Glauber's salt used may be from 10 to 15 times the weight of the cellulose which is in the form of cellulose xanthate in the fiber-containing viscose, with about 12.5 preferred. The crystal size should be within the range heretofore customarily employed in the manufacture of cellulosic sponges.

The preferred amount of aluminum powder is approximately 10% of the weight of the cellulose which is in the form of cellulose xanthate in the fiber-containing viscose, with 3% to 15% being acceptable. The particle size of the aluminum powder may range between 40 mesh and 325 mesh. (A 40-mesh screen has a square screen opening of 420 microns, and a 325-mesh screen has a square screen opening of 44 microns.) If the aluminum particles are too small, the reaction between them and the caustic soda occurs too rapidly, during the mixing cycle; and there are not enough particles left after the sponge mix is placed in the molds to cause the mix to foam and rise sufficiently. If, on the other hand, the particles are too large, the reaction time between the particles and the caustic soda is too long, thus increasing the time needed for rising beyond an economical point.

The fiber content may be from 2% to 6% of the total weight of fiber-containing viscose, with 2.7% preferred. The fibers used may consist of fibers of jute, hemp, nylon, cotton, etc.

The viscosity of the sponge mix controls the size of the holes or pores in the sponge—the higher the viscosity, the smaller the pores, and vice versa. The viscosity can be reduced by adding water and increased by adding more salt crystals or fibers.

In order to realize the objectives hereinabove stated, it is requisite that the aluminum powder and Glauber's salt crystals be used in combination. The aluminum powder reacts with the caustic soda in the viscose to release bubbles of hydrogen which cause the viscose to foam. This foam, containing Glauber's salts uniformly distributed therethrough, when coagulated and regenerated by means of heat or acid, forms a porous structure having a uniform pattern of pore sizes. If aluminum powder is used as the sole pore-former, the pore boundaries of such structure are films which have poor sponging action and which rewet slowly once they have become dry. The addition of fine Glauber's salt acts to control the coagulation of the pore walls in such a manner that the final pore walls are feathery (have a large capillary surface) with the result that the sponge has, in addition to a uniform pattern of pore sizes, rapid-wetting and wipe-dry characteristics essential to a high quality sponge structure.

Another feature critical to the process of this invention is that the completed sponge mix, containing the aluminum powder and the Glauber's salt crystals, must be allowed to stand in the molds until it has expanded to full volume and set, before it is coagulated and regenerated. After the ingredients are mixed, if the temperature of the mass is raised (by cooking) before the sponge structure is set (i. e., before gelation is started), the mass viscosity will drop and the gaseous by-products of regeneration and the hydrogen from the aluminum reaction will blow the sponge during cooking. This ruptures the supporting cellulose structure within the mass, and final regeneration gives a weak and collapsed sponge.

The following example of a preferred embodiment will serve to further illustrate the principles and practice of this invention.

*Example*

To 315.7 lbs. of a viscose containing 31.1 lbs. of cellulose (in the form of cellulose xanthate) and 2.7% hemp fibers (cut into the desired length) are added 390 lbs. of fine Glauber's salt (approximately 12 mesh), which is thoroughly mixed in, and 3.1 lbs. of aluminum powder (particle size between 40 mesh and 325 mesh, with 50% retention on a 300-mesh screen) which is mixed in for an additional 5 minutes. If desired, the Glauber's salt crystals and the aluminum powder may be pre-mixed in a separate operation before being added to the fiber-containing viscose. This is an aid in the rapid distribution of a relatively small amount of aluminum powder in the mix.

The sponge mix is then transferred to molds and is allowed to stand for approximately 1 hour until it has completely risen, due to the evolution of hydrogen in the reaction of the aluminum powder with the NaOH in the viscose, and the structure has set. The risen and set sponge mix is then coagulated and regenerated by means of heat (cooked), as described in United States Patent No. 1,909,629 (Pfannenstiel et al.) or No. 2,133,810 (Craigue). The coagulated sponges are removed from the molds, washed, bleached, purified, and dried.

I claim:

1. A process for the production of cellulosic sponges which comprises mixing together viscose, fibers, Glauber's salt crystals, and aluminum powder having a particle size within the range of from 40 mesh to 325 mesh, to form a sponge mixture, placing said mixture in a mold, permitting said mixture to expand to maximum volume and set, and thereafter removing said Glauber's salt crystals, heating the resulting expanded mixture to coagulate and regenerate said mixture, whereby to form a cellulosic sponge structure.

2. A process according to claim 1 wherein the amount of Glauber's salt crystals in the mixture is from 10 to 15 times the weight of cellulose present in the form of cellulose xanthate, and the amount of aluminum powder is from 3%–15% of the weight of said cellulose present.

3. A process according to claim 2 wherein the amount of Glauber's salt crystals is about 12.5 times the weight of cellulose, and the amount of aluminum powder is about 10% of the weight of cellulose.

References Cited in the file of this patent

UNITED STATES PATENTS

| | | |
|---|---|---|
| 1,777,247 | Bayer | Sept. 30, 1930 |
| 2,105,380 | Speijer | Jan. 11, 1938 |
| 2,205,734 | Scherer | June 25, 1940 |
| 2,268,621 | Roberts et al. | Jan. 6, 1942 |
| 2,341,509 | Bley | Feb. 15, 1944 |

UNITED STATES PATENT OFFICE
CERTIFICATE OF CORRECTION

Patent No. 2,836,503                                                  May 27, 1958

Robert Otto Osborn

It is hereby certified that error appears in the printed specification of the above numbered patent requiring correction and that the said Letters Patent should read as corrected below.

Column 4, lines 3 and 4, strike out "and thereafter removing said Glauber's salt crystals," and insert the same before "whereby" in line 5, same column.

Signed and sealed this 23rd day of September 1958.

(SEAL)
Attest:

KARL H. AXLINE
Attesting Officer

ROBERT C. WATSON
Commissioner of Patents